United States Patent [19]

Houmard et al.

[11] Patent Number: 5,590,743
[45] Date of Patent: Jan. 7, 1997

[54] PRE-LOAD DEVICE FOR REDUCING AIRCRAFT BRAKE VIBRATION

[75] Inventors: James E. Houmard, Akron; Dana J. Fehr, Uniontown, both of Ohio

[73] Assignee: Aircraft Braking Systems Corporation, Inc., Akron, Ohio

[21] Appl. No.: 335,294

[22] Filed: Nov. 7, 1994

[51] Int. Cl.$^6$ .................................................. B64C 25/44
[52] U.S. Cl. ...................... 188/71.4; 301/6.91; 244/111
[58] Field of Search .............................. 188/71.4, 71.1, 188/73.35, 73.36, 73.37, 205 A, 18 R, 18 A; 301/6.91, 6.2; 244/111

[56] References Cited

U.S. PATENT DOCUMENTS 4,815,679  3/1989  Perry .......................................... 244/111
5,131,511  7/1992  Appleberry ............................ 244/111 X

FOREIGN PATENT DOCUMENTS 338139  11/1930  United Kingdom .................... 244/111

*Primary Examiner*—Josie Ballato
*Attorney, Agent, or Firm*—Renner, Kenner, Greive, Bobak, Taylor & Weber

[57] ABSTRACT

A wheel and brake assembly is provided for use with an aircraft. A landing gear strut depends from the aircraft and an axle is mounted to the strut. At least one brake assembly housing is mounted to the axle, on either side of the strut. One or more torque take-out pins are provided on the strut to be received in mating sockets provided in the brake assembly housing. Torque from the brake assembly housing is transferred to the strut or a stationary member by way of the pins and sockets. At least one tie rod member engages lug members provided on at least one brake assembly housing and the strut or stationary member. At least two brake assembly housings mounted on opposite sides of the strut may be interconnected by at least one tie rod member. Thus, the brake assembly housing is interconnected and may be drawn toward the strut or stationary member by selective adjustment of a turnbuckle incorporated into the tie rod member. When the brake assembly housing is drawn toward a stationary member the torque take-out pins angularly bottom out in the sockets such that a pre-load force is generated between the brake assembly housing and the stationary member. By disposing a washer between the pin and the socket any excessive clearance is eliminated so as to generate another pre-load force. Furthermore, a pre-load force is created at the axle and a torque tube leg that bears upon the axle. Accordingly, vibration and noise are reduced during aircraft braking.

13 Claims, 3 Drawing Sheets

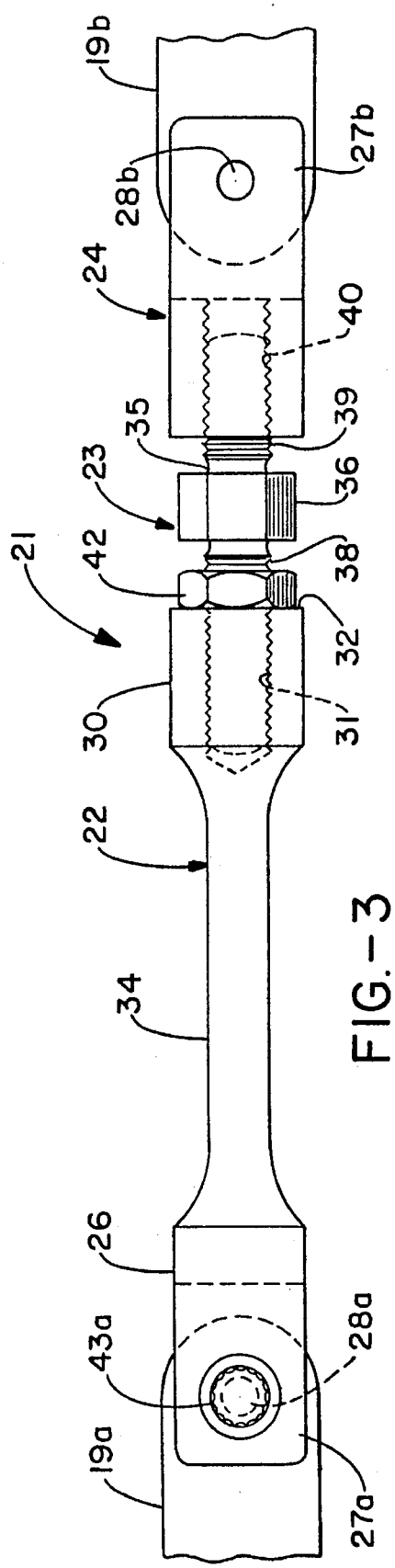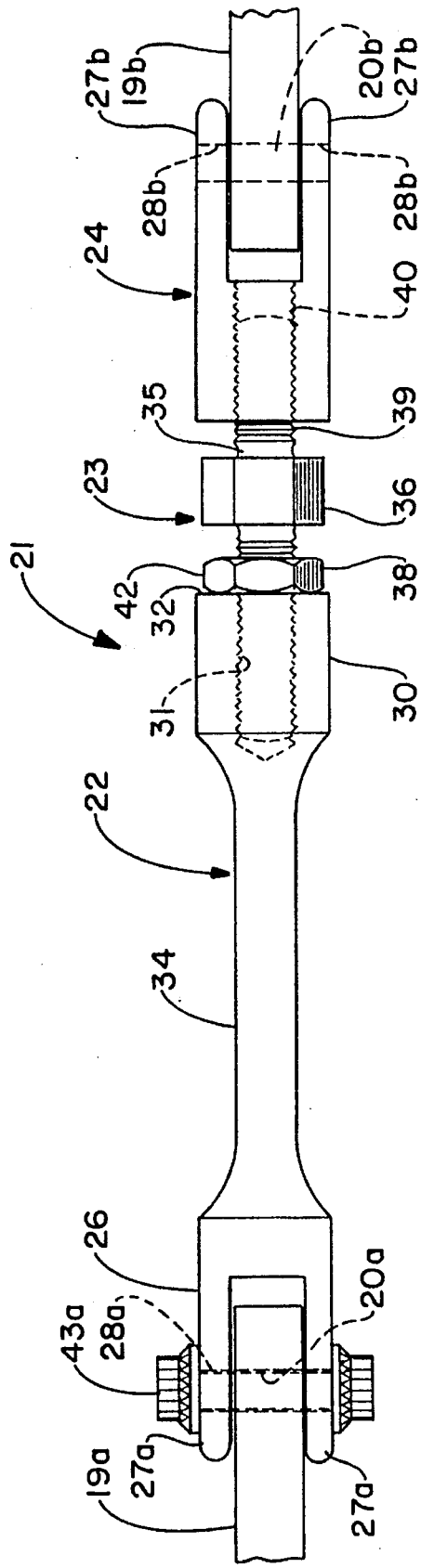

5,590,743

PRE-LOAD DEVICE FOR REDUCING AIRCRAFT BRAKE VIBRATION

TECHNICAL FIELD

The invention herein resides in the art of vibration control devices. More particularly the invention relates to such vibration control devices which are used in conjunction with torque transfer devices. Specifically, the invention relates to such vibration control devices used in conjunction with aircraft landing gear struts and disc brake assemblies for the purpose of dampening vibration and increasing the structural stiffness of the disc brake assemblies.

BACKGROUND ART

Heretofore it has been known to use disc brake assemblies on the wheels of aircraft. It is further known that large, heavy commercial aircraft often have several wheel and brake assemblies. Typically, such aircraft include a plurality of wheels on the landing gear struts. Each wheel strut will support one or more wheels along with the associated brake assemblies. The disc brake systems used with such aircraft typically comprise a brake housing having a number of stacked stationary friction discs affixed therein. A plurality of rotating friction discs are affixed to the wheel member by conventional means and are interleaved between the stationary discs of the brake housing. An appropriate conventional hydraulic brake application system is used to selectively bring the friction discs into frictional engagement.

The inboard and outboard brake housings on each strut may be interconnected to one another by way of retaining cables which are tied to lugs on the exterior of the brake housings. The retaining cables typically include approximately 1" of slack and serve merely to prevent accidental removal of the brake housing from the wheel strut. Of course, other methods of preventing accidental removal of the brake housings may be employed.

During braking a large quantity of torque is transferred to the brake housing by way of the stationary discs. This torque is often transferred to the wheel strut by way of torque take-out pins which protrude from the landing gear strut to engage mating sockets in the brake housing. The pins and sockets also serve as a means of registration for properly aligning the brake assembly with the strut.

A problem associated with such configurations has been the vibration and noise created during braking due to the relatively large amount of clearance between the torque take-out pins and the housing sockets. This clearance permits movement between the pin and socket resulting in a low frequency noise on the order of 120 Hz. Previous attempts to dampen this unwanted vibration and noise have not proven successful.

Accordingly, it is most desirable to obtain a device which may effectively reduce the low frequency noise and vibration generated at the torque take-out pins during aircraft braking.

DISCLOSURE OF INVENTION

In light of the foregoing, it is an aspect of the invention to provide a vibration control device for reducing aircraft braking noise and dampening vibration of the brake housing.

Another aspect of the invention is the provision of a vibration dampening device which serves to pre-load and tension components within the brake assembly housing.

Yet an additional aspect of the invention is the provision of a vibration control device wherein the housing retaining cables of present brake systems are not required.

Still another aspect of the present invention is the provision of such a vibration control device which is easily implemented with existing apparatus and techniques. A further aspect of the present invention is the provision of a vibration control device that structurally provides full advantage of the stiffness of the brake housing.

The foregoing and other aspects of the invention which will become apparent as the detailed description proceeds are achieved by an improved wheel and brake assembly for an aircraft, comprising: a strut member depending from the aircraft, the strut member having an inboard side and an outboard side, and torque take-out means for transferring torque to the strut member; at least one brake assembly being mounted on the strut member; means for engaging the torque take-out means incorporated in the brake assembly housing; and means for pre-loading the means for engaging relative to the torque take-out means.

Other aspects of the invention are attained by a pre-loading and tensioning device for use with aircraft braking systems having brake assembly housings mounted on both the inboard and outboard sides of a strut member and engaging torque take-out pins extending from the strut, the device comprising: tie rod means connected between the inboard and outboard brake assembly housings; the tie rod means being adapted to selectively draw the inboard and outboard brake assembly housings toward one another so as to pre-load the torque take-out pins relative to the housings.

Still other aspects of the invention are attained by a wheel and brake assembly for an aircraft, comprising: a strut member depending from the aircraft, the strut member having an inboard side and an outboard side; an axle connected to the strut member; at least one torque take-out pin extending outwardly from each of the inboard and outboard sides of the strut member; a first brake assembly housing mounted on the axle, on the inboard side of the strut member; a second brake assembly housing mounted on the axle on the outboard side of the strut member; at least one torque take-out pin receiving socket mateably engaging the torque take-out pin when the brake assembly housings are mounted on the axle; at least one lug member extending outwardly from each of the first and second brake assembly housings, the lug member having a bolt aperture therein; at least one tie rod member having a link portion, a fork portion, and a turnbuckle portion; the link portion having a fork comprising a pair of tabs, the tabs having a bolt aperture therein; the link portion also having a turnbuckle receiving aperture therein; the fork portion having a pair of tab members, the tab members having a bolt aperture therein; and the fork portion also having a turnbuckle receiving aperture therein; the turnbuckle portion of the tie rod member having a bolt member having a head, a first threaded shaft and a second threaded shaft; the turnbuckle portion also having a jam nut threadably received on the first threaded shaft; the first threaded shaft having right hand threading and threadably received in the turnbuckle receiving aperture of the link portion; the second threaded shaft having left handed threading and threadably received in the turnbuckle receiving aperture of the fork portion; the tab members of the link portion mateably receiving the lug member of the first brake housing; a first bolt member passing through the bolt apertures of the tab members of the link portion and also passing through the bolt aperture of the lug member to lockingly engage the tie rod member to the first brake assembly housing; the tab members of the fork portion mateably receiving the lug member of the second brake assembly housing; and a second bolt member passing through the bolt receiving apertures of the tab members and also passing through the bolt aperture of the lug member to lockingly engage the tie rod member to the second brake assembly housing, thereby connecting the first brake assembly housing with the second brake assembly housing; whereby the bolt member of the turnbuckle portion may be threadably rotated within the turnbuckle receiving apertures of the link portion and the fork portion to selectively draw the first brake assembly housing toward the second brake assembly housing so that the torque take-out pins on each side of the strut bottom out in the respective torque take-out pin receiving sockets of each of the first and second brake assembly housings to pre-load both radially and axially the first and second brake assembly housings relative to the strut member so as to reduce vibration and noise during aircraft braking.

DESCRIPTION OF THE DRAWINGS

For a complete understanding of the objects, techniques and structure of the invention, reference should be made to the following detailed description and accompanying drawings wherein:

FIG. 3 is an elevational view of the novel tie rod member;

FIG. 4 is a top plan view of the tie rod of FIG. 3.

BEST MODE FOR CARRYING OUT THE INVENTION

Figure 1:
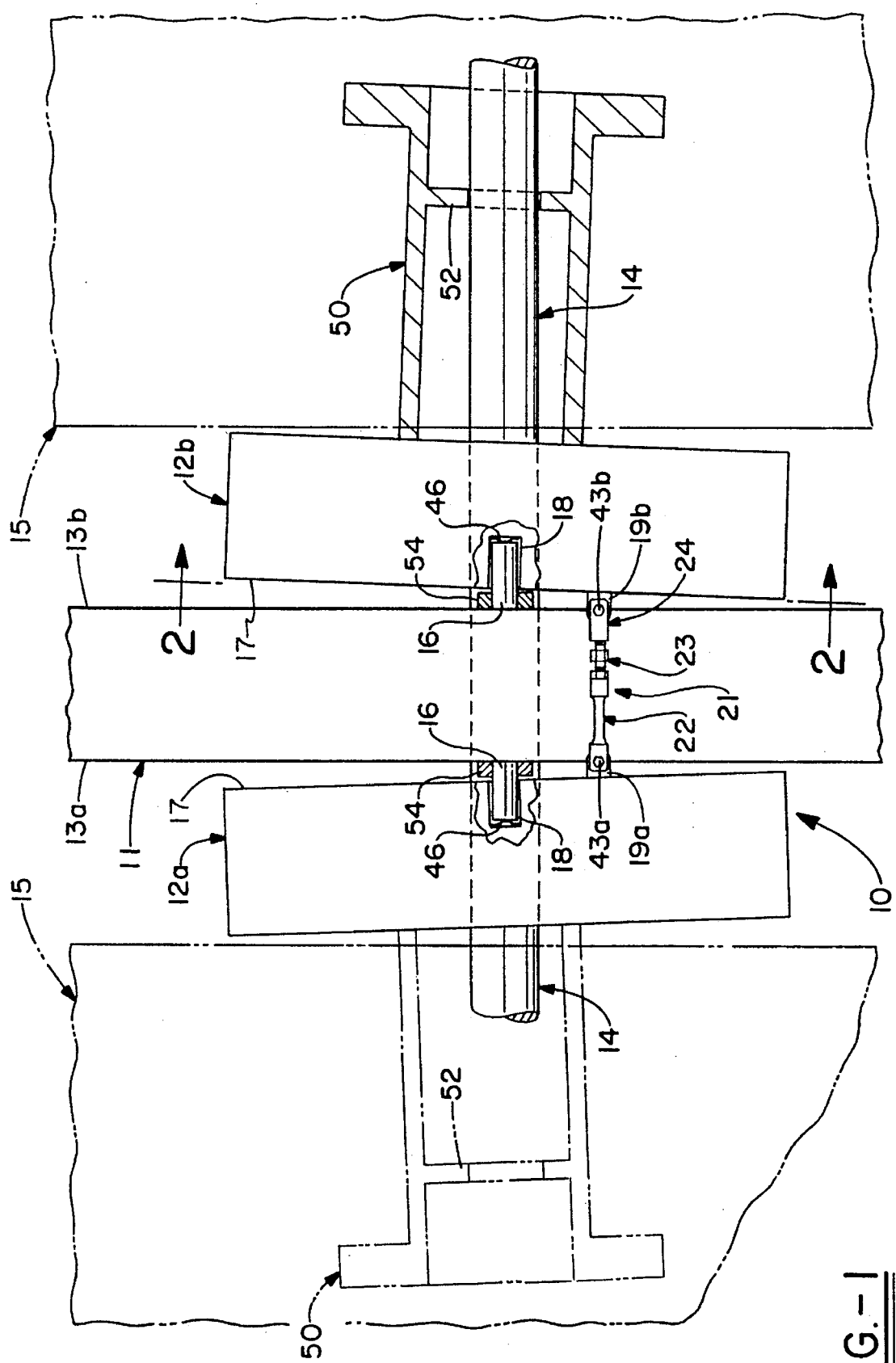
FIG. 1 is a diagrammatic elevational view, partially in cross section, of a portion of a wheel and brake assembly embodying the concepts of the present invention.

Referring now to the drawings and more particularly to FIG. 1, it can be seen that an aircraft wheel and brake assembly embodying the concepts of the present invention is designated generally by the numeral 10. While it will be appreciated that the concept of the invention is applicable to many variations of brake assemblies, the description herein will be with respect to a wheel and brake assembly of the nature shown. In such a device a landing gear strut member 11 having an inboard side 13a and an outboard side 13b is mounted to the air frame of an aircraft (not shown) through conventional means. Brake assembly housings 12 are then fitted to the strut 11 by way of a conventional axle 14, as are wheels 15. A torque tube 50 integrally extends outwardly from the brake assembly housing 12 into the wheels 15. A torque tube leg 52 extends radially inwardly from the torque tube 50 to bear upon the axle 14 so as to provide a pre-load to the brake assembly 10.

Figure 2:
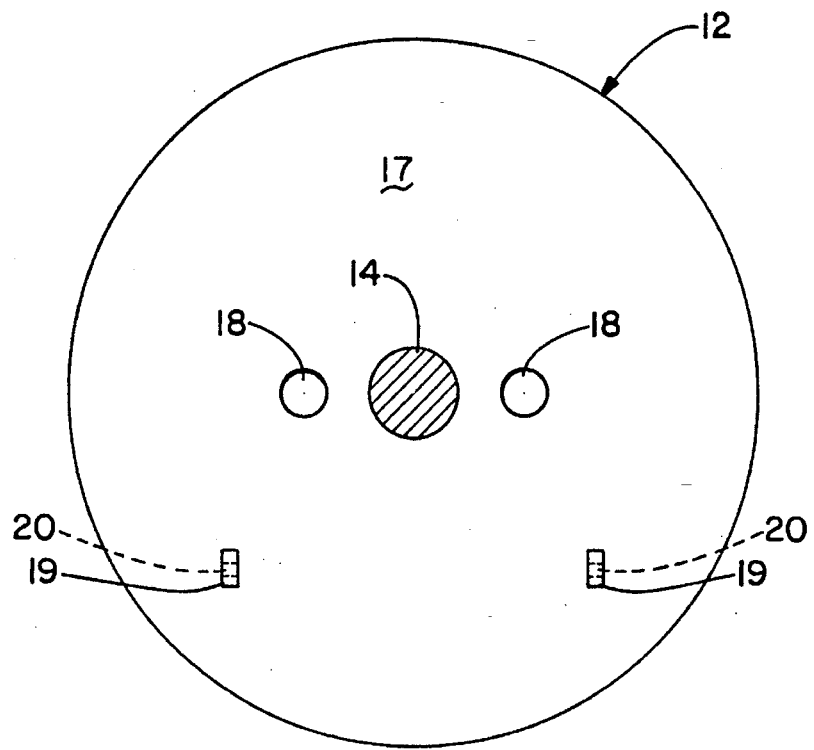
FIG. 2 is a cross sectional view of the brake assembly housing of FIG. 1 taken along the line 2—2.

With continued reference to FIG. 1 and also referring to FIG. 2, it can be seen that the strut member 11 includes one or more torque take-out pins 16, which extend orthogonally from the strut 11. The brake assembly housing 12 includes in its inboard face 17 an appropriate number of torque take-out pin receiving sockets 18 which mateably receive and engage corresponding torque take-out pins 16 from the strut 11. As is well known in the art, a bushing 54 is integral with either the strut 11 or the brake assembly 12 to provide a bearing surface therebetween. It should be noted that each brake assembly housing 12 houses conventional stacked friction discs and hydraulic actuating means (not shown). It should also be noted that during aircraft braking, torque from the friction discs is transferred to the brake housing 12 and hence to the strut 11 by way of the torque tube 50 and by way of the pins 16 and sockets 18. The sockets 18 and pins 16 may be located in various locations, it only being important that there is mating alignment when the brake housing 12 is mounted to the strut 11. Accordingly, a pair of sockets 18 are shown lying on a major diameter and in diametrical opposition from one another. As such, during aircraft braking, torque is directly taken out of the friction discs by the take-out pins 16.

The brake assembly housing 12 further includes a pair of lug members 19 which extend generally orthogonally from the inboard face 17 of the housing 12. The lug members 19 each include a bolt aperture 20. The lug members 19 are offset from the major diameter, but lie in facing opposition to one another proximal to the outer circumference of the housing 12.

With reference now to FIGS. 3 and 4, a tie rod assembly 21 is shown. The tie rod assembly 21 includes a link portion 22, a turnbuckle portion 23 and a fork block 24. The link portion 22 includes an integral fork 26 having a pair of opposed tabs 27a. Each tab 27 includes a lug bolt aperture 28. The tabs 27a are spaced such that the lugs 19a of the brake housing 12a may be mateably received therein so as to allow alignment of the bolt apertures 20a of the lug 19a with the bolt apertures 28a of the tie rod 21. The link portion 22 further includes an integral turnbuckle receiving block 30, having a threaded turnbuckle aperture 31 in its end face 32. The fork 26 and receiving block 30 are at opposite ends of the link portion 22 and are connected by way of an integral shaft 34.

The turnbuckle portion 23 of the tie rod 21 is comprised primarily of a bolt member 35 having a central head 36, a first threaded shaft 38, and a second threaded shaft 39. The threaded shafts 38, 39 each extend in opposite directions from one another from the central head 36. Further, the shafts 38, 39 have oppositely cut threads. That is to say the first shaft 38 has right hand threading while the second shaft 39 has left hand threading.

The fork block 24 is very similar to the fork 26 of the link portion 22. Accordingly, the fork block 24 includes tabs 27b and lug bolt apertures 28b for mating engagement of the fork block 24 to the brake housing lugs 19. The fork block 24 also includes a threaded turnbuckle aperture 40, tapped to threadably receive the second shaft 39 of the turnbuckle bolt 35.

The tie rod 21 is assembled by first threading the second threaded shaft 39 of the bolt member 35 into the aperture 40 of the fork block 24. The first threaded shaft 38 may then be fitted with an appropriately threaded jam nut 42 and threaded into the aperture 31 of the link portion 22.

In operation, the tie rod 21 interconnects the inboard brake housing 12a of a two wheel landing gear with the outboard brake housing 12b by way of the lugs 19. Specifically, the fork tabs 27a are mateably aligned with the lugs 19a of the housing 12a and a bolt 43a is employed to affix the tie rod 21 to the lug 19a. The tabs 27b of the fork block 24 are similarly mated and connected with a lug 19b on the outboard brake housing 12b by a bolt 43b. A second tie rod 21 may be similarly connected between additional lugs 19 of the respective inboard 12a and outboard 12b brake housings.

Once the tie rods 21 are installed on the assembly 10 the turnbuckle bolt 35 may then be rotated to selectively increase or decrease the tension between the brake housings 12a and 12b. Further, the jam nut 42 may be threadably tightened against the end face 32 of the turnbuckle receiving block 30 to maintain the desired adjustment.

It should now be apparent how the desired noise and vibration reduction may be achieved. Specifically, the oppositely threaded shafts 38, 39 of the turnbuckle 23 allow the tie rod 21 to urge the housings 12a and 12b toward one another. This causes the torque take-out pins 16 to bottom out in their respective sockets 18 thereby reducing any excessive clearance therebetween. Additionally, any excessive clearance between the axle 14 and torque tube leg 52 is removed as the tie rods 21 urge the brake housings 12a and 12b toward one another. Therefore, as discussed above, the tie rods 21 provide a pre-load to the wheel and brake assembly 10 in two places.

It will be appreciated that the off-center location of the tie rods 21, which are eccentric from the axle 14 center line, generates pre-load forces at the sockets 18 and at the torque tube leg 52. Further, the offset nature of the lugs 19 from the major diameter causes a shift in moment from the primary diameter to the chord passing through the lugs 19. Accordingly, the torque take-out pins 16 are loaded both radially and axially within the sockets 18. Likewise, the torque tube leg 52 is pre-loaded both radially and axially on the axle 14.

Thus, the brake housing 12 may be selectively pre-loaded so as to provide full advantage of the stiffness of the brake assembly 10. This pre-loading reduces movement of the pins 16 within the sockets 18 and reduces movement of the torque tube leg 52 on the axle 14, thereby reducing vibration and the noise associated therewith. Additionally, the tie rod assembly 21 further serves to replace the retaining cable of the prior art, by preventing accidental removal of the brake housing 12.

Figure 1A:
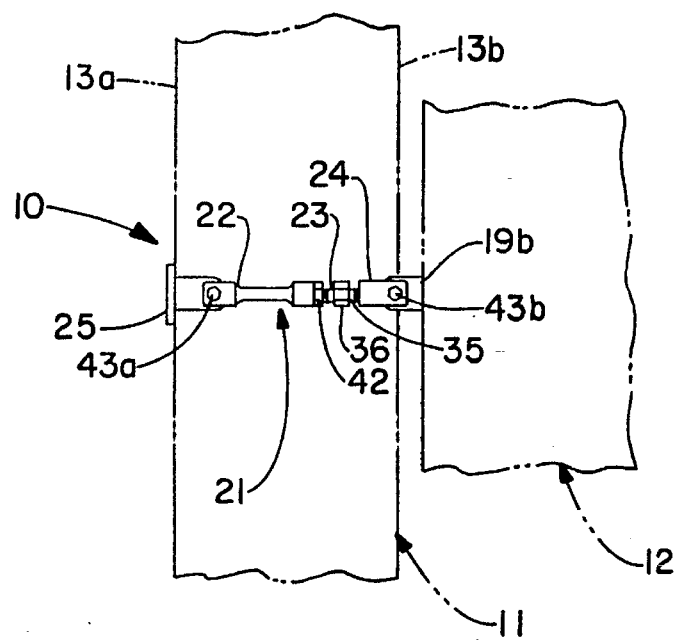
FIG. 1A is a partial diagrammatic elevational view of a portion of a wheel and brake assembly illustrated embodying the concepts of the present invention, but wherein only one brake housing is employed.

Referring now to FIG. 1A, it can be seen that an alternative embodiment of the present invention is shown. In this alternative embodiment, only one brake housing 12 is employed. As in the preferred embodiment, the tie rod 21 is secured at the fork tabs 27b to the brake housing 12 in the manner described above. However, in the alternative embodiment, the fork tabs 27a at the end of the tie rod 21 are secured to the landing gear strut member 11 by an arm 25. It will be appreciated that the arm 25 has the same receiving features of the lugs 19 for securing the arm 25 to the tie rod 21. The opposite end of arm 25 is secured to the strut member 11 in a manner well known in the art. It will be appreciated that the tie rod 21 is operated in the same manner as described above by loosening the jam nut 42, adjusting the turnbuckle bolt 35 as desired, and then retightening the nut 42. Of course, the arm 25 may be secured to any fixed member associated with the aircraft wheel and brake assembly 10 so that the pre-load may be imparted thereto.

The alternative embodiment shown in FIG. 1A also reduces the noise and vibration of the wheel and brake 10 assembly in a similar manner. The tie rod 21 decreases the clearance between the take-out pins 16 and respective sockets 18 of the associated wheel and brake assembly 10. The tie rod 21 also reduces the clearance between the torque tube leg 52 and the axle 14. As such, a single brake housing 12 may be selectively pre-loaded so as to take advantage of the stiffness of the strut member 11 and the brake housing 12. As before, this stiffness reduces the movement of the pins 16 within the sockets 18 and the torque tube leg 52 with respect to the axle 14 to reduce any associated noise or vibration. Although only one tie rod 21 is shown, multiple tie rods 21 may be employed between the strut member 11 and the brake housing 12.

An additional alternative embodiment is also illustrated in FIG. 1, wherein a washer 46 may be disposed between the torque take-out pins 16 and the bottom of their respective sockets 18. The washer 46 functions to decrease the amount of clearance between the torque take-out pins 16 and their respective sockets 18 and therefore employ full advantage of the stiffness of the brake housing 12 to reduce noise and vibration. Although any type of washer 46 is beneficial, in the preferred embodiment, the washers 46 are of the Belleville spring type. Those skilled in the art will appreciate that the washers 46 may be employed, without the use of the tie rod 21, to obtain the desired pre-load forces between the brake housing 12 and the landing gear strut member 11. Of course, the washers 46 may be employed in conjunction with the tie rods 21 to achieve additional pre-load force on the wheel and brake assembly 10. Use of the Belleville washer 46 facilitates maintenance of preload in the tie rod assembly 21 during the operational life of the wheel and brake assembly. The washer 46 also functions to provide a pre-load to the brake assembly 10. It will be appreciated that the washer 46 may be disposed in any proximate position between the take-out pin 16 and socket 18 to exert a pre-load force Thus, it can be seen that the objects of the invention have been satisfied by the structure presented above. While in accordance with the patent statutes, only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. An improved wheel and brake assembly for an aircraft, the improvement comprising:

a strut member depending from the aircraft;

said strut member having an inboard side and an outboard side and torque take-out means extending orthogonally therefrom for transferring torque to said strut member;

at least one brake assembly being mounted on said strut member;

means for engaging said torque take-out means incorporated in said one brake assembly; and means for pre-loading said means for engaging orthogonal to said brake assembly.

2. The improvement in a wheel and brake assembly for an aircraft according to claim 1, wherein said torque take-out means comprises at least one pin member extending from said strut member.

3. The improvement in a wheel and brake assembly for an aircraft according to claim 1, wherein said means for engaging said torque take-out means comprises at least one receiving socket in said brake assembly.

4. The improvement in a wheel and brake assembly for an aircraft according to claim 1, wherein said means for pre-loading said means for engaging orthogonally to said brake assembly comprises: at least one washer disposed between said means for engaging and said torque take-out means.

5. The improvement in a wheel and brake assembly for an aircraft according to claim 1, wherein said means for pre-loading said means for engaging orthogonally to said brake assembly comprises:

at least one arm extending from said strut member; and at least one tie rod member mateably engaging said arm at one end and mateably engaging said brake assembly at an opposite end so as to interconnect said strut member to said brake assembly.

6. The improvement in a wheel and brake assembly for an aircraft according to claim 1, further comprising:

at least two brake assembly housings, at least one being mounted on said inboard side of said strut member, and at least one being mounted on said outboard side of said strut member, wherein said means for pre-loading said means for engaging relative to said torque take-out means has at least one lug member extending from each of said at least two brake assembly housings; and at least one tie rod member mateably engaging said at least one lug member of each of said at least two brake assembly housings so as to interconnect said at least two brake assembly housings.

7. The improvement in a wheel and brake assembly for an aircraft according to claim 6, wherein said at least one lug member includes a bolt receiving aperture therein.

8. The improvement in a wheel and brake assembly for an aircraft according to claim 7, wherein said at least one tie rod member comprises:

a link portion, a fork portion, and a turnbuckle portion;

said link portion having a fork at a first end thereof, said fork having a pair of tab members, each of said tab members having a bolt receiving aperture therein;

said link portion also having a threaded turnbuckle receiving aperture in a second end thereof;

said fork portion having a pair of tab members at a first end thereof, each of said tab members having a bolt receiving aperture therein;

said fork portion also having a threaded turnbuckle receiving aperture in a second end thereof;

said turnbuckle portion having a bolt member, said bolt member having a head and first and second threaded shafts;

said turnbuckle portion having a jam nut threaded onto said first threaded shaft;

said first threaded shaft threadably received in said turnbuckle receiving aperture of said link portion and said second threaded shaft threadably received in said turnbuckle receiving aperture of said fork portion;

a first bolt member received in said bolt apertures of said tab members of said link portion and also in said bolt aperture of said at least one lug member to lockingly engage said tie rod member to one of said at least two brake assembly housings; and a second bolt member received in said bolt apertures of said tab members of said fork portion and also in said bolt receiving aperture of said at least one lug member to lockingly engage said tie rod member to the other of said at least two brake assembly housings;

whereby said at least two brake assembly housings may be urged toward one another by selectively rotating said turnbuckle portion of said tie rod member within said threaded turnbuckle receiving apertures so as to pre-load both, radially and axially, said torque take-out means relative to said means for engaging said torque take-out means, thereby reducing vibration and noise during aircraft braking.

9. A pre-loading and tensioning device for use with aircraft braking systems having brake assembly housings mounted on both the inboard and outboard sides of a strut member and engaging torque take-out pins extending from the strut, the device comprising:

tie rod means connected between the inboard and outboard brake assembly housings;

said tie rod means adapted to selectively draw the inboard and outboard brake assembly housings toward one another so as to pre-load the torque take-out pins relative to the housings.

10. A pre-loading and tensioning device according to claim 9, wherein said tie rod means comprises:

a link portion;

a turnbuckle portion threadably engaging said link portion; and a fork portion threadably engaging said turnbuckle portion.

11. A pre-loading and tensioning device according to claim 10, wherein said link portion engages the brake assembly housing mounted on the inboard side of the strut and said fork portion engages the brake assembly housing mounted on the outboard side of the wheel strut.

12. A wheel and brake assembly for an aircraft, the assembly comprising:

a strut member depending from the aircraft, said strut member having an inboard side and an outboard side;

an axle connected to said strut member;

at least one torque take-out pin extending outwardly from each of said inboard and outboard sides of said strut member;

a first brake assembly housing mounted on said axle on said inboard side of said strut member;

a second brake assembly housing mounted on said axle on said outboard side of said strut member;

at least one torque take-out pin receiving socket in each of said first and second brake assembly housings, said at least one torque take-out pin receiving socket mateably engaging said at least one torque take-out pin when said brake assembly housings are mounted on said axle;

at least one lug member extending outwardly from each of said first and second brake assembly housings, said at least one lug member having a bolt aperture therein;

at least one tie rod member having a link portion, a fork portion, and a turnbuckle portion;

said link portion of said tie rod member having a fork comprising a pair of tabs, said tabs having a bolt aperture therein;

said link portion also having a turnbuckle receiving aperture therein;

said fork portion having a pair of tab members, said tab members having a bolt aperture therein, and said fork portion also having a turnbuckle receiving aperture therein;

said turnbuckle portion of said tie rod member having a bolt member, said bolt member having a head, a first threaded shaft and a second threaded shaft;

said turnbuckle portion also having a jam nut threadably received on said first threaded shaft of said bolt member;

said first threaded shaft having right hand threading and threadably received in said turnbuckle receiving aperture of said link portion;

said second threaded shaft having left hand threading and threadably received in said turnbuckle receiving aperture of said fork portion;

said tab members of said link portion mateably receiving said at least one lug member of said first brake housing;

a first bolt member passing through said bolt apertures of said tab members of said link portion and also passing through said bolt aperture of said at least one lug member to lockingly engage said tie rod member to said first brake assembly housing;

said tab members of said fork portion mateably receiving said at least one lug member of said second brake assembly housing; and a bolt member passing through said bolt receiving apertures of said tab members and also passing through said bolt aperture of said at least one lug member to lockingly engage said tie rod member to said second brake assembly housing thereby connecting said first brake assembly housing with said second brake assembly housing;

whereby said bolt member of said turnbuckle portion may be threadably rotated within said turnbuckle receiving aperture of said link portion and said turnbuckle receiving aperture of said fork portion selectively to draw said first brake assembly housing toward said second brake assembly housing so that said at least one torque take-out pin on each of said inboard and outboard sides of said strut member bottom out in the respective at least one torque take-out pin receiving sockets of each of said first and second brake assembly housings to pre-load both radially and axially said first and second brake assembly housings relative to said strut member so as to reduce vibration and noise during aircraft braking.

13. A wheel and brake assembly for an aircraft, comprising:

a strut member depending from the aircraft;

at least one brake assembly mounted to said strut member;

at least one arm extending orthogonally from said strut member; and at least one tie rod member mateably engaging said arm at one end and mateably engaging said brake assembly at an opposite end to orthogonally interconnect said strut member to said brake assembly to selectively draw said strut member toward said brake assembly to reduce vibration of the wheel and brake assembly.

* * * * *